United States Patent Office 3,654,304
Patented Apr. 4, 1972

3,654,304
ALKYL 1,1a,2,6b-TETRAHYDROCYCLOPROP[b]
INDOLE 1-CARBOXYLATES AND ACIDS
William John Welstead, Jr., Richmond, Va., assignor to
A. H. Robins Company, Incorporated, Richmond, Va.
No Drawing. Filed Jan. 26, 1970, Ser. No. 5,897
Int. Cl. C07d 27/36
U.S. Cl. 260—326.3                    8 Claims

ABSTRACT OF THE DISCLOSURE

Alkyl 2-substituted - 1,1a,2,6b - tetrahydrocycloprop[b]indole-1-carboxylates and the corresponding acids are disclosed. The compounds are prepared by reacting 1-acyl- and 1-carbamoyl-indoles with alkyl diazoacetates at 50–70° C. Two isomeric alkyl-2-substituted-1,1a,2,6b-tetrahydrocycloprop[b]indole-1-carboxylates are formed and are separated by column chromatography. The esters are designated as exo and endo isomers on the basis of their nuclear magnetic resonance spectra. The acids are prepared by basic hydrolysis of the esters.

---

The present invention relates to novel ring condensed indoles and is more particularly concerned with alkyl 2-substituted - 1,1a,2,6b - tetrahydrocycloprop[b]indole-1-carboxylates and 2-substituted-1,1a,2,6b-tetrahydrocycloprop[b]indole-1-carboxylic acids, the exo and endo isomers, and to therapeutic compositions containing the same as active ingredients, and to methods of making and administering said compounds and compositions.

The novel indoles of the invention are represented by the following structural formula:

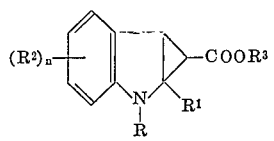

Formula I wherein:
R is acyl and carbamoyl, and wherein the hydrocarbon portion of R is naphthyl, phenyl, lower-alkylphenyl, lower - alkoxyphenyl, trifluoromethylphenyl and halophenyl,
R¹ is hydrogen and methyl,
R² is lower alkyl, lower alkoxy, trifluoromethyl and halogen of atomic weight less than eighty,
R³ is hydrogen and lower alkyl, and
n is a positive integer from zero to two inclusive.

The present invention resides in the synthesis of novel ring condensed indoles having useful pharmacological activity. Efforts to prepare ring condensed indoles by reacting indole and 1-methylindole with ethyl diazoacetate have heretofore been unsuccessful. [J. Chem. Soc. (1958) 1179]. We have found that 1-acylindoles and 1-carbamoylindoles readily react with alkyl diazoacetates in the presence of a cuprous salt catalyst to give alkyl 2-substituted - 1,1a,2,6b - tetrahydrocycloprop[b]indole - 1 - carboxylates. Two geometric isomers are formed in the reaction and they are readily separated by column chromatography. The esters are saponified to the acids which are pharmacologically active as anti-inflammatory agents. In addition, the 2-substituted-1,1a,2,6b-tetrahydrocycloprop[b]indole-1-carboxylic acids have been found to be thermally unstable at their melting points and under proper thermal conditions are converted to 1-substituted indole-3-acetic acids. The latter compounds are known chemotherapeutic agents, broadly useful in treating arthritic disorders.

The novel compounds of the invention and, in particular, the acids, have an ameliorating effect against inflamed cellular sites. Among the novel compounds of the invention which have been shown to possess anti-inflammatory action, the compounds of Example 27 and, in particular, the exo isomer 2-(p-chlorophenylcarbamoyl)-1,1a,2,6b-tetrahydrocycloprop[b]indole-1-carboxylic acid is especially preferred. The anti-inflammatory action of the novel compounds of the present invention was demonstrated using the Evans Blue-carrageenan pleural effusion assay in rats (L. F. Sancilio and Lim, R.K.S., Proc. Soc. Exp. Biol. Med., 127, 597, 1968 and Goldstein, S. and Schnall, M., Arch. Int. Pharmacodyn. 144, 296, 1963).

It is, therefore, an object of the present invention to provide novel alkyl 2-substituted -1,1a,2,6b-tetrahydrocycloprop[b]indole - 1 - carboxylates and 2-substituted-1,1a,2,6b - tetrahydrocycloprop[b]indole - 1 - carboxylic acids. A further object is to prepare 2-substituted-1,1a,2,6b - tetrahydrocycloprop[b]indole - 1 - carboxylic acids having utility as anti-inflammatory agents. An additional object is to provide methods for producing the novel compounds, therapeutic compositions containing the same and methods for the utilization thereof. Other objects will be apparent to one skilled in the art and still other objects will become apparent hereinafter.

In the definition of symbols in the foregoing Formula I and where they appear elsewhere throughout this specification the terms have the following significance.

The term "lower-alkyl" as used herein includes straight and branched chain radicals of up to eight carbon atoms inclusive and is exemplified by such groups as methyl, ethyl, propyl, isopropyl, butyl, amyl, hexyl, octyl, and the like. "Lower alkoxy" has the formula —O-lower-alkyl.

When halogen is referred to herein, preferably but not necessarily, a halogen of atomic weight less than eighty is employed.

The lower alkyl and lower alkoxy substituents of lower-alkylphenyl and lower-alkoxyphenyl have preferably one to four carbon atoms which can be arranged as straight or branched chains.

The following Chart I illustrates the process of the invention and shows the various procedures involved both in preparing the starting materials and the final products of the invention. In Chart I, all symbols have the values previously assigned.

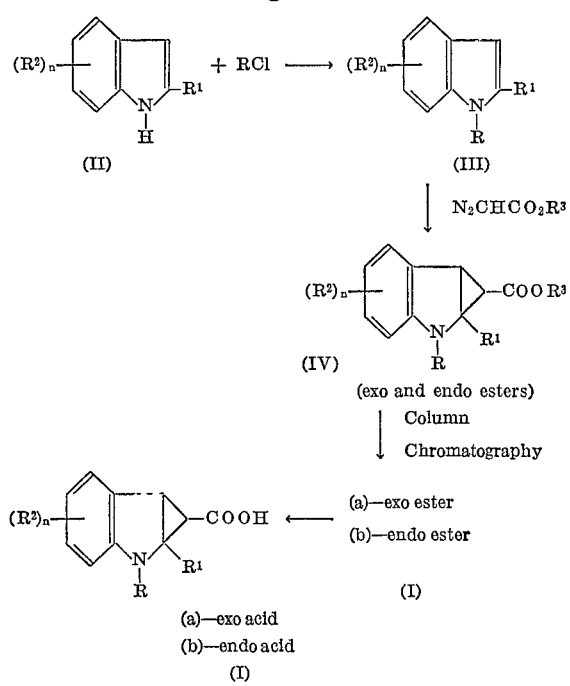

The starting materials for the process of the present invention are the appropriately 1-substituted indoles represented in Chart I by Formula III. These materials (III) may in turn be obtained from a substituted indole, shown as Formula II, by reaction with an acyl halide or an isocyanate by methods known to the art.

As shown in Chart I, the general procedure for the preparation of the compounds of the invention involves the reaction of 1-substituted indoles (III) with an alkyl diazoacetate to give a mixture of exo and endo alkyl 2-substituted - 1,1a,6b - tetrahydrocycloprop[b]indole - 1 - carboxylates (IV). The exo and endo esters are separated by column chromatography and the respective isomers (I) are hydrolyzed to the free acids (I). The exo designation is assigned to the geometric isomer in which the carboxylate and carboxylic radicals are inclined away from the indole nucleus and the endo designation is assigned to the geometric isomer in which the carboxylate and carboxylic radicals are inclined toward the indole nucleus.

A suitable general procedure for carrying out the process of the invention is as follows:

An equimolar mixture of a 1-substituted indole (III) and a cuprous salt, preferably cuprous cyanide, is warmed to about 60° C. Optionally, the mixture can be diluted with a chlorinated solvent such as chloroform or methylene chloride. The stirred mixture is treated dropwise over a period of one half hour to one hour with a excess amount of an alkyl diazoacetate with the pot temperature maintained at 50° C. to 70° C. and preferably at 55° C. to 65° C. The completeness of the reaction is determined by vapor phase chromatography and additional alkyl diazoacetate is added, if necessary, to insure a maximum yield of IV. The reaction mixture, after completion of the reaction, is diluted with a solvent, illustratively benzene, the mixture filtered the filtrate concentrated and the residual oil chromatographed on a column of magnesium silicate. The respective geometric isomers are separated, purified by crystallization from a suitable solvent and assigned their proper designation as exo or endo by their nuclear magnetic resonance spectra. The pure esters are hydrolyzed generally, but not necessarily, in an ethanolic alkaline medium to the acids (I) which are isolated from the hydrolyzate by conventional laboratory procedures.

The product compounds of the invention may be formulated for use by incorporating them into standard pharmaceutical dosage forms such as capsules, tablets and injectables containing 0.5–500 mg. the exact dosage varying with the weight and age of the subject being treated and the severity of the condition. Among the pharmaceutical excipients which may be used are lactose, talc, gelatin, magnesium stearate, sodium carboxylmethylcellulose, and peanut oil.

The following examples are given by way of illustration only and are not to be construed as limiting.

EXAMPLE 1

Exo and endo ethyl 2-benzoyl-1,1a,2,6b-tetrahydrocycloprop[b]indole-1-carboxylate A mixture of 11 g. (0.05 mole) of 1-benzoylindole and 6 g. (0.05 mole) of cuprous cyanide was warmed at about 60° C. until an oil formed. The stirred oil was treated dropwise with 6 g. (0.05 mole) of ethyl diazoacetate over a period of 30 minutes with the pot temperature maintained at 50–60° C. Vapor phase chromatography indicated incomplete reaction. An additional 4 g. of ethyl diazoacetate was added dropwise; the mixture was then diluted with benzene and filtered. The benzene filtrate was concentrated and the residual oil was chromatographed on 250 g. of magnesium silicate. The starting material was eluted with pure benzene followed by isomer A. Elution with 1% acetone-benzene gave isomer B. Both isomers solidified on standing. Isomer A was recrystallized from isooctane-isopropyl ether, weighed 3 g. (20%) and melted at 94–96° C. Isomer B was recrystallized from isopropyl ether, weighed 1.5 g. (10%) and melted at 114–116° C. Nuclear magnetic resonance confirmed A to be the exo isomer and B to be the endo isomer.

Analysis.—Calculated for $C_{19}H_{17}N_1O_3$ (percent): C, 74.25; H, 5.57; N, 4.56. Found (percent): Exo isomer: C, 74.26; H, 5.59; N, 4.48. Endo isomer: C, 74.00; H, 5.58; N, 4.53.

EXAMPLE 2

Exo and endo ethyl 2-(p-chlorobenzoyl)-1a-methyl-1,1a,2,6b-tetrahydrocycloprop[b]indole - 1 - carboxylate Using the procedure of Example 1, a stirred mixture of 27 g. (0.1 mole) of 1-(p-chlorobenzoyl)-2-methylindole and 9 g. (0.1 mole) of cuprous cyanide was warmed to 60° C. and treated dropwise with 11.4 g. (0.1 mole) of ethyl diazoacetate. The temperature was maintained at 55–65° C. during the addition. An additional 15 g. of ethyl diazoacetate was added to the reaction mixture. The isomeric mixture was chromatographed on magnesium silicate and the exo isomer (isomer A) was recrystallized from isopropyl ether, weighed 9.5 g. (27%) and melted at 129–131° C. The endo isomer (isomer B) was recrystallized from isopropyl ether, weighed 2.3 g. (6.5%) and melted at 126–128° C.

Analysis.—Calculated for $C_{20}H_{18}ClNO_3$ (percent): C, 67.51; H, 5.10; N, 3.94. Found (percent): Exo isomer: C, 67.54; H, 5.09; N, 3.90. Endo isomer: C, 67.45; H, 5.13; N, 3.94.

EXAMPLE 3

Exo and endo ethyl 2-(p-chlorobenzoyl)-5-methoxy-1,1a,2,6b-tetrahydrocycloprop[b]indole - 1 - carboxylate A stirred slurry of 24 g. (0.084 mole) of 1-(p-chlorobenzoyl)-5-methoxyindole and 7.6 g. (0.08 mole) of cuprous cyanide in 15 ml. of methylene chloride at 50° C. was treated dropwise with 10 g. (0.08 mole) of ethyl diazoacetate. Vapor phase chromatography indicated incomplete reaction. An additional 20 g. of ethyl diazoacetate was added dropwise and after stirring for a brief period the reaction mixture was diluted with benzene and filtered. The filtrate was concentrated and the residual oil was chromatographed on 500 g. of magnesium silicate.

The isomers were eluted using a benzene-acetone gradient elution and were recrystallized from isopropyl ether. The exo isomer (isomer A) weighed 8.5 g. (27%) and melted at 135–138° C. The endo isomer (isomer B) weighed 1.2 g. (4%) and melted at 94–96° C.

*Analysis.*—Calculated for $C_{20}H_{18}ClNO_4$ (percent): C, 64.60; H, 4.88; N, 3.77. Found (percent): Exo isomer: C, 64.63; H, 4.91; N, 3.77. Endo isomer: C, 64.80; H, 4.90; N, 3.73.

The physical constants and analytical data of Examples 4–12 prepared as in Examples 1–3 are shown in Table I.

tallized from benzene-ethanol. The product weighed 0.8 g. (62%) and melted at 241–243° C.

*Analysis.*—Calculated for $C_{17}H_{13}NO_3$ (percent): C, 73.10; H, 4.69; N, 5.02. Found (percent): C, 73.11; H, 4.73; H, 5.00.

EXAMPLE 15

Endo 2-benzoyl-1,1a,2,6b-tetrahydrocyclo- prop[b]indole-1-carboxylic acid

Using the procedure of Example 14 above, 1.5 g. (0.05 mole) of endo ethyl 2-benzoyl-1,1a,2,6b-tetrahydrocyclo-

TABLE I

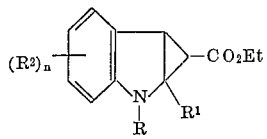

| Example | Isomer | R | R¹ | R² | M.P., °C. | Calculated C | Calculated H | Calculated N | Found C | Found H | Found N |
|---|---|---|---|---|---|---|---|---|---|---|---|
| 4 | Exo | 4-ClC₆H₄NHCO— | H |  | 185–90 | 63.96 | 4.80 | 7.85 | 63.63 | 4.76 | 7.75 |
|  | Endo | 4-ClC₆H₄NHCO— | H |  | 203–04 | 63.78 | 4.80 | 7.76 |  |  |  |
| 5 | Exo | 4-CH₃OC₆H₄CO— | H |  | 99–104 | 71.20 | 5.68 | 4.15 | 71.39 | 5.71 | 4.21 |
| 6 | Exo | 1-naphthoyl | H |  | 130–32 | 77.29 | 5.36 | 3.92 | 77.85 | 5.48 | 3.85 |
|  | Endo | do | H |  | 133–36 | 77.44 | 5.40 | 3.84 |  |  |  |
| 7 | Exo | o-ClC₆H₄CO— | H |  | 90–93 |  |  |  |  |  |  |
| 8 | Exo | p-ClC₆H₄CO— | CH₃ | 4,5-di-CH₃O | 160–62 | 63.54 | 5.33 | 3.37 | 63.22 | 5.34 | 3.36 |
| 9 | Exo | o-ClC₆H₄CO— | CH₃ | 5-CH₃O | 113–19 | 63.57 | 5.22 | 3.63 | 65.33 | 5.20 | 3.62 |
| 10 | Exo | C₆H₅CO— | H | 5-CH₃O | 129–32 | 71–20 | 5.68 | 4.15 | 71.22 | 5.65 | 4.19 |
|  | Endo | C₆H₅CO— | H | 5-CH₃O | 138–40 | 71.15 | 5.70 | 4.14 |  |  |  |
| 11 | Exo | m-CF₃C₆H₄CO— | H | 5-CH₃O | 140–42 | 62.22 | 4.48 | 3.46 | 62.42 | 4.54 | 3.46 |
|  | Endo | m-CF₃C₆H₄CO— | H | 5-CH₃O | 134–36 |  |  |  |  |  |  |
| 12 | Exo | p-ClC₆H₄CO— | CH₃ | 5-CH₃O | 118–20 | 65.37 | 5.22 | 3.63 | 65.59 | 5.24 | 3.58 |

EXAMPLE 13

By the procedure of Example 1 using, in place of 1-benzoylindole and ethyl diazoacetate, methyl diazoacetate and the following:

1-(m-trifluoromethylphenylcarbamoyl)-2-methyl-5-trifluoromethylindole,
1-(p-anisylcarbamoyl)-5-methylindole,
1-(p-fluorobenzoyl)-2-methyl-5-chloroindole,
1-(p-methylbenzoyl)-2-methyl-5-methoxyindole,
1-(m-methoxybenzoyl)-5-fluoroindole, the products are, respectively:

exo and endo methyl 1a-methyl-2-(m-trifluoromethyl-phenylcarbamoyl)-5-trifluoromethyl-1,1a,2,6b-tetrahydrocycloprop[b]indole-1-carboxylate,
exo and endo methyl 2-(p-anisylcarbamoyl)-5-methyl-1,1a,2,6b-tetrahydrocycloprop[b]indole-1-carboxylate,
exo and endo methyl 2-(p-fluorobenzoyl)-1a-methyl-5-chloro-1,1a,2,6b-tetrahydrocycloprop[b]indole-1-carboxylate,
exo and endo methyl 2-(p-methylbenzoyl)-1a-methyl-5-methoxy-1,1a,2,6b-tetrahydrocycloprop[b]indole-1-carboxylate, and
exo and endo methyl 2-(m-methoxybenzoyl)-5-fluoro-1,1a,2,6b-tetrahydrocycloprop[b]indole-1-carboxylate.

EXAMPLE 14

Exo 2-benzoyl-1,1a,2,6b-tetrahydrocycloprop[b]indole-1-carboxylic acid

A mixture of 1.5 g. (0.05 mole) of exo ethyl 2-benzoyl-1,1a,2,6b-tetrahydrocycloprop[b]indole - 1 - carboxylate, 2 ml. of 5 N sodium hydroxide and 10 ml. of 95% ethanol was refluxed one hour. The reaction mixture was diluted with water and extracted with ether. The aqueous basic fraction was acidified with 3 N hydrochloric acid and the precipitate was collected by filtration and recrysprop[b]indolecarboxylate was saponified with 5 N sodium hydroxide. The crude product was isolated and was recrystallized from benzene-ethanol; the recrystallized product weighed 1.2 g. (88%) and melted at 213–215° C.

*Analysis.*—Calculated for $C_{17}H_{13}NO_3$ (percent): C, 73.10; H, 4.69; N, 5.02. Found (percent): C, 73.18; H, 4.71; N, 4.91.

EXAMPLE 16

Exo 2-(chlorobenzoyl)-1a-methyl-1,1a,2,6b-tetrahydrocycloprop[b]indole-1-carboxylic acid A stirred mixture of 7.5 g. (0.021 mole) of exo ethyl 2 - (p - chlorobenzoyl) - 1a - methyl-1,1a,2,6b-tetrahydrocycloprop[b]indole-1-carboxylate and 75 ml. of 95% ethanol and was heated to 50° C.; 10 ml. of 5 N sodium hydroxide was added dropwise over a period of 30 minutes. Stirring was continued for one hour. The crude product was isolated by acidifying the basic mixture and filtration of the precipitated acid; it weighed 6 g. (88%). After recrystallization from benzene-isooctane, the purified acid weighed 5.2 g. (75%) and melted at 183–185° C.

*Analysis.*—Calculated for $C_{18}H_{14}ClNO_3$ (percent): C, 65.96; H, 4.31; N, 4.27. Found (percent): C, 66.07; H, 4.31; N, 4.28.

EXAMPLE 17

Exo 2-(p-chlorobenzoyl)-5-methoxy-1,1a,2,6b-tetrahydrocycloprop[b]indole-1-carboxylic acid A stirred suspension of 6.7 g. (0.018 mole) of exo ethyl 2 - (p - chlorobenzoyl) - 5 - methoxy - 1,1a,2,6b-tetrahydrocycloprop[b]indole-1-carboxylate in 80 ml. of 95% ethanol was treated with 5 ml. of 5 N sodium hydroxide. The reaction mixture was heated at 50° C. for two hours and diluted with water. After extraction with ether, the aqueous fraction was acidified and the precipitate was collected by filtration and washed with methanol. The product which was recrystallized from ethanol-water weighed 4.6 g. (67%) and melted at 250–252° C.

*Analysis.*—Calculated for $C_{18}H_{14}ClNO_4$ (percent): C, 62.89; H, 4.10; N, 4.07. Found (percent): C, 62.96; H, 4.07; N, 4.14.

Some of the physical properties and the analytical data of Examples 18–28, prepared as in Examples 14–17, are given in Table II.

TABLE II

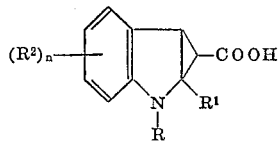

| Example | Isomer | R | $R^1$ | $R^2$ | M.P., °C. | Calculated C | Calculated H | Calculated N | Found C | Found H | Found N |
|---|---|---|---|---|---|---|---|---|---|---|---|
| 18 | Exo | p-ClC$_6$H$_4$CO— | H | 5-CH$_3$O | 250–252 | 62.89 | 4.10 | 4.07 | 62.96 | 4.07 | 4.14 |
| 19 | Endo | p-ClC$_6$H$_4$CO— | H | 5-CH$_3$O | 205–207 | 62.89 | 4.10 | 4.07 | 63.04 | 4.14 | 4.09 |
| 20 | Exo | o-ClC$_6$H$_4$CO— | H | | 281–283 | 65.08 | 3.86 | 4.46 | 65.04 | 3.94 | 4.31 |
| 21 | Exo | o-ClC$_6$H$_4$CO— | CH$_3$ | 5-CH$_3$O | 220–223 | 63.78 | 4.51 | 3.91 | 63.58 | 4.52 | 3.91 |
| 22 | Exo | p-ClC$_6$H$_4$CO— | CH$_3$ | 5-CH$_3$O | 213–215 | 63.78 | 4.51 | 3.91 | 63.93 | 4.61 | 3.87 |
| 23 | Exo | C$_6$H$_4$CO— | H | 6-CH$_3$O | 228–230 | 69.89 | 4.89 | 4.53 | 69.81 | 4.86 | 4.56 |
| 24 | Exo | m-CF$_3$C$_6$H$_4$CO— | H | 5-CH$_3$O | 250–253 | 60.48 | 3.74 | 3.71 | 60.35 | 3.79 | 3.73 |
| 25 | Exo | 1-naphthoyl | H | | 228–231 | 76.58 | 4.59 | 4.25 | 76.59 | 4.66 | 4.24 |
| 26 | Exo | p-ClC$_6$H$_4$CO— | CH$_3$ | 4,5-di-CH$_3$O | 217–221 | 61.94 | 4.68 | 3.61 | 62.04 | 4.67 | 3.60 |
| 27 | Exo | p-ClC$_6$H$_4$NHCO— | H | | 215–217 | 62.11 | 3.99 | 8.52 | 61.94 | 4.21 | 8.30 |
| 28 | Exo | p-CH$_3$OC$_6$H$_4$CO— | H | | 235–238 | 69.89 | 4.89 | 4.53 | 70.36 | 4.95 | 4.52 |

EXAMPLE 29

By the procedure of Example 14 using, in place of exo ethyl 2-benzoyl-1,1a,2a6b-tetrahydrocycloprop[b]indole-1-carboxylate, the following:

exo methyl 2-(m-trifluoromethylphenylcarbamoyl)-1a-methyl-5-trifluoromethyl-1,1a,2,6b-tetrahydrocycloprop[b]indole-1-carboxylate,
exo methyl 2-(p-anisylcarbamoyl)-5-methyl-1,1a,2,6b-tetrahydrocycloprop[b]indole-1-carboxylate,
endo methyl 2-(p-fluorobenzoyl)-1a-methyl-5-chloro-1,1a,2,6b-tetrahydrocycloprop[b]indole-1-carboxylate,
exo methyl 2-(p-methylbenzoyl)-1a-methyl-5-methoxy-1,1a,2,6b-tetrahydrocycloprop[b]indole-1-carboxylate,
endo methyl 2-(m-methoxybenzoyl)-5-fluoro-1,1a,2,6b-tetrahydrocycloprop[b]indole-1-carboxylate, and
the products are respectively:
exo 2-(m-trifluoromethylphenylcarbamoyl)-1a-methyl-5-trifluoromethyl-1,1a,2,6b-tetrahydrocycloprop[b]indole-1-carboxylic acid,
exo 2-(p-anisylcarbamoyl)-5-methyl-1,1a,2,6b-tetrahydrocycloprop[b]indole-1-carboxylic acid,
endo 2-(p-fluorobenzoyl)-1a-methyl-5-chloro-1,1a,2,6b-tetrahydrocycloprop[b]indole-1-carboxylic acid,
exo 2-(p-methylbenzoyl)-1a-methyl-5-methoxy-1,1a,2,6b-tetrahydrocycloprop[b]indole-1-carboxylic acid, and
endo 2-(m-methoxybenzoyl)-5-fluoro-1,1a,2,6b-tetrahydrocycloprop[b]indole-1-carboxylic acid.

What is claimed:

1. A compound selected from exo and endo 1,1a,2,6b-tetrahydrocycloprop[b]indole-1-carboxylic acids having the formula:

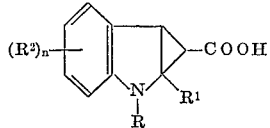

wherein:

R is selected from the group consisting of

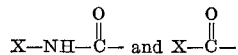

wherein X is selected from 1-naphthyl, phenyl, lower-alkyl phenyl, lower-alkoxy phenyl, trifluoromethylphenyl and halophenyl, $R^1$ is selected from the group consisting of hydrogen and methyl, $R^2$ is selected from the group consisting of lower alkyl, lower alkoxy, trifluoromethyl and halogen of atomic weight less than eighty, and n is a positive integer from zero to two inclusive.

2. A compound as defined in claim 1 which is exo 2-(p-chlorobenzoyl)-5-methoxy-1a-methyl-1,1a,2,6b-tetrahydrocycloprop[b]indole-1-carboxylic acid.

3. A compound as defined in claim 1 which is exo 2-(p-chlorophenylcarbamoyl) - 1,1a,2,6b - tetrahydrocycloprop[b]indole-1-carboxylic acid.

4. A compound selected from exo and endo alkyl 1,1a,2,6b-tetrahydrocycloprop[b]indole - 1 - carboxylates having the formula:

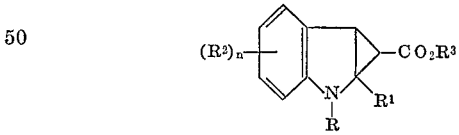

wherein

R is selected from the group consisting of

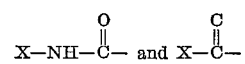

wherein X is selected from 1-naphthyl, phenyl, lower-alkyl phenyl, lower-alkoxy phenyl, trifluoromethylphenyl and halophenyl, $R^1$ is selected from the group consisting of hydrogen and methyl, $R^2$ is selected from the group consisting of lower alkyl, lower alkoxy, trifluoromethyl and halogen of atomic weight less than eighty, $R^3$ is lower alkyl, and n is a positive integer from zero to two inclusive.

5. A process for the preparation of exo and endo 1,1a,2,6b-tetrahydrocycloprop[b]indole-1-carboxylic acids having the formula:

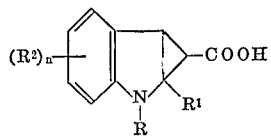

wherein:

R is selected from the group consisting of $$X-NH-\overset{O}{\underset{\|}{C}}- \text{ and } X-\overset{O}{\underset{\|}{C}}-$$

wherein X is selected from 1-naphthyl, phenyl, lower-alkyl phenyl, lower-alkoxy phenyl, trifluoromethylphenyl and halophenyl, $R^1$ is selected from the group consisting of hydrogen and methyl, $R^2$ is selected from the group consisting of lower alkyl, lower alkoxy, trifluoromethyl and halogen of atomic weight less than eighty, and n is a positive integer from zero to two inclusive, which comprises the steps of (1) reacting 1-substituted-indoles of the formula:

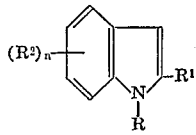

wherein R, $R^1$, $R^2$ and n have the values given hereinabove, with a lower alkyl, diazoacetate at 50° C. to 70° C. to produce exo and endo lower - alkyl-1,1a,2,6b-tetrahydrocycloprop[b]-indole-1-carboxylates, (2) chromatographing the mixture of geometric isomers on a magnesium silicate column into the respective geometric exo and endo isomers, and (3) saponifying an aqueous alcoholic medium the respective geometric exo and endo esters from step (2) to produce the geometric exo and endo 1,1a,2,6b-tetrahydrocycloprop[b]indole - 1 - carboxylic acids.

6. A process as defined in claim 5 wherein step (1) is carried out at a temperature of 55–65° C.

7. A process as defined in claim 6 wherein step (1) is carried out in the presence of a cuprous salt.

8. A process as defined in claim 7 wherein the cuprous salt is cuprous cyanide.

References Cited

UNITED STATES PATENTS 3,010,972  11/1961  Kaiser et al. _____ 260—330.5

ALEX MAZEL, Primary Examiner

J. A. NARCAVAGE, Assistant Examiner

U.S. Cl. X.R.

424—274

UNITED STATES PATENT OFFICE
CERTIFICATE OF CORRECTION

Patent No. 3,654,304　　　　　　Dated Apr. 4, 1972

Inventor(s) William John Welstead, Jr.

It is certified that error appears in the above-identified patent and that said Letters Patent are hereby corrected as shown below:

In Table I, Example 10, change "63.57" to read --65.37--.

Example 10, change "71-20" to --71.20--.

Signed and sealed this 12th day of September 1972.

(SEAL)
Attest:

EDWARD M. FLETCHER, JR.　　　　　ROBERT GOTTSCHALK
Attesting Officer　　　　　　　　Commissioner of Patents

FORM PO-1050 (10-69)　　　　　　　　　　　　　　　USCOMM-DC 60376-P69